(12) United States Patent
Venkataraman et al.

(10) Patent No.: US 10,740,256 B2
(45) Date of Patent: Aug. 11, 2020

(54) RE-ORDERING BUFFER FOR A DIGITAL MULTI-PROCESSOR SYSTEM WITH CONFIGURABLE, SCALABLE, DISTRIBUTED JOB MANAGER

(71) Applicant: Cavium, LLC, Santa Clara, CA (US)

(72) Inventors: Kalyana Sundaram Venkataraman, Santa Clara, CA (US); Jason Daniel Zebchuk, Watertown, MA (US); Gregg Alan Bouchard, Georgetown, TX (US); Tejas Maheshbhai Bhatt, Sunnyvale, CA (US); Hong Jik Kim, San Jose, CA (US); Eric Marenger, Montreal (CA); Ahmed Shahid, San Jose, CA (US)

(73) Assignee: Marvell Asia Pte, Ltd., Singapore (SG)

(*) Notice: Subject to any disclaimer, the term of this patent is extended or adjusted under 35 U.S.C. 154(b) by 70 days.

(21) Appl. No.: 15/602,620

(22) Filed: May 23, 2017

(65) Prior Publication Data

US 2018/0341602 A1 Nov. 29, 2018

(51) Int. Cl.

| G06F 13/16 | (2006.01) |
|---|---|
| G06F 12/02 | (2006.01) |
| G06F 9/50 | (2006.01) |
| G06F 9/52 | (2006.01) |
| G06F 9/48 | (2006.01) |

(52) U.S. Cl.
CPC ........ G06F 13/1626 (2013.01); G06F 9/5016 (2013.01); G06F 9/524 (2013.01); G06F 12/023 (2013.01); G06F 13/1663 (2013.01); G06F 13/1673 (2013.01); G06F 9/4881 (2013.01); G06F 9/5083 (2013.01)

(58) Field of Classification Search
CPC .. G06F 13/1626; G06F 9/524; G06F 13/1663; G06F 13/1673; G06F 12/023; G06F 9/5016; G06F 9/4881; G06F 9/5083
See application file for complete search history.

(56) References Cited

U.S. PATENT DOCUMENTS

| 5,179,665 A * | 1/1993 | Roslund | G06F 15/167 |
|---|---|---|---|
| | | | 709/213 |
| 5,941,962 A * | 8/1999 | Hirano | H04N 1/32363 |
| | | | 710/53 |
| 6,754,739 B1 * | 6/2004 | Kessler | G06F 9/544 |
| | | | 710/36 |

(Continued)

*Primary Examiner* — Francisco A Grullon
(74) *Attorney, Agent, or Firm* — pkalousek.ip

(57) ABSTRACT

A method utilizing a system encompassing a free pool buffer; a deadlock avoidance buffer; and a controller communicatively coupled to the free pool buffer and the deadlock avoidance buffer to reorder out-of-order responses to fetch requests into correct order by: receiving a fetch request on behalf of a consumer; allocating space first in the free pool buffer and when such space is not available then allocating space in a division associated with the consumer in the deadlock avoidance buffer. Issuing segment(s) of the fetch request including associated tag(s) to one of one or more memories; writing response data for each of the segment(s) to the allocated space in the free buffer or the deadlock avoidance buffer according to each of the associated tag(s); and transferring the response data to the consumer according to an entry in an ordering first-in, first-out buffer and an entry in a pending request array.

20 Claims, 9 Drawing Sheets

(56) References Cited

U.S. PATENT DOCUMENTS

| | | | | |
|---|---|---|---|---|
| 7,882,296 | B2* | 2/2011 | Reed | G06F 13/4036 710/23 |
| 8,738,860 | B1* | 5/2014 | Griffin | G06F 12/0897 711/122 |
| 2002/0083243 | A1* | 6/2002 | Van Huben | G06F 9/524 710/107 |
| 2004/0133744 | A1* | 7/2004 | Van Doren | G06F 9/524 711/118 |
| 2006/0059316 | A1* | 3/2006 | Asher | G06F 9/30014 711/141 |
| 2009/0157969 | A1* | 6/2009 | Harding | G06F 12/0842 711/129 |
| 2014/0281809 | A1* | 9/2014 | Billa | G06F 17/30327 714/764 |
| 2014/0317353 | A1* | 10/2014 | Asher | G06F 9/30014 711/130 |
| 2016/0077997 | A1* | 3/2016 | Froese | H04L 43/02 709/212 |

\* cited by examiner

RE-ORDERING BUFFER FOR A DIGITAL MULTI-PROCESSOR SYSTEM WITH CONFIGURABLE, SCALABLE, DISTRIBUTED JOB MANAGER

BACKGROUND

1. Field

The present disclosure relates to digital processing systems. More particularly, this invention is directed toward a re-ordering buffer for a digital multi-processor system with configurable, scalable, distributed job manager.

2. Description of Related Technology

Digital data processing systems numerically manipulate data in the form of discrete, discontinuous sequences of numbers or symbols. Such data may represent any type of information, e.g., text, image, signals, or any other type of information known to a person of ordinary skill in the art.

An algorithm to be executed by the digital data processing system may comprise a plurality of jobs, i.e., specific tasks to be performed by one of the multiple processing devices, that must be efficiently scheduled among the plurality of the processing devices. The scheduling must take into account considerations comprising, e.g., the architecture of the processing devices, the ability of the processing devices to process a type of job, the required coordination and/or sequence among the jobs, the dependence of the jobs on external events, and other considerations known to a person of ordinary skill in the art. In real-time applications, the digital data processing may further require the scheduling to adhere to strict timelines defined by the digital data processing algorithms. In addition, a flexible scheduling solution is needed, to allow customer specific digital data processing algorithms.

To perform processing of the scheduled job, a job command comprising, e.g., a job identifier and a location of a job descriptor, is provided to a processing device. The job descriptor comprises a plurality of sections, e.g., a job configuration, a list of commands describing input data for the job, a list of commands describing output data to be produced by the job, a completion event section, and/or any other information relevant to the job as known to a person of ordinary skill in the art. To process a job, at least some sections of the job descriptor may need to be read from one or more memories. Consequently, each processing device comprises at least one physical port through which the one or more memories are accessed.

In general, an interface between a processing device requiring the job descriptor's data and a memory is optimized for efficiency; consequently, the data returned from the memory in response to fetch requests may not be returned in the order in which the fetch requests were issued. To reorder the data received out-of-order in relation to the order in which the fetch requests were issued, a reorder buffer is used.

To enable reordering, a fetch request is assigned an entry in the re-order buffer, so that the response to the fetch request can be written to the assigned entry. Furthermore, additional information enabling association between the fetch request and returned data, delivery to the requestor, and other information known to a person of ordinary skill in the art may be required. The entry and the additional information are organized into a tag structure. The fetch request, comprising a fetch command and the tag is sent to the memory.

Upon receiving the fetch request, the memory creates a response comprising the requested data in accordance with the content of the tag, and sends the response together with the tag back to the requesting entity. The reorder buffer then uses the tag information to write the data into the entry of the reorder buffer and uses the additional information from the tag to reorder the data.

Recent increases in complexity of the digital data processing algorithms, whereby algorithms can require a configurable environment, significant technological innovations in information processing, requiring software defined algorithmic processors, and increased processing requirements, whereby multiple processing devices are required to achieve performance, increases the demands on the design of the digital data processing system.

The requirement for multiple processing devices increases the demands on the scheduler. To address scalability and improve optimization of job scheduling, subsets of the multiple processing devices may be organized into a plurality of processing engines, wherein each processing engine may comprise a job manager responsible for coordinating progress of the scheduled job among one or more of the processing devices, as disclosed in a co-pending application entitled METHOD AND APPARATUS FOR JOB PRE-SCHEDULING BY DISTRIBUTED JOB MANAGER IN A DIGITAL MULTI-PROCESSOR SYSTEM, filed on May 5, 2017, application Ser. No. 15/588,240.

However, increases in algorithm complexity may necessitate large job descriptors, with multiple read and write port sections. At the same time, the job manager may need to buffer all or a part of a job descriptor for each job for each processing device it manages. Consequently, a job manager, managing a plurality of processing devices, each potentially capable of processing multiple jobs at the same time, reading the job descriptors for each of the DSP and/or HA, might require excessive processing power and excessive chip area due to a requirement for additional buffering to read and store the job descriptors for each of the managed processing devices independently. To mitigate the problem, the job manager attempts to fetch each section of each job descriptor on-demand, i.e., as the processing device becomes ready to process a portion of a section of the job descriptor. To reduce the amount of time waiting for responses to come back from the memory, the job manager pre-fetches portions of the job descriptor sections into a buffer before it knows when the processing device will be able to process that portion of the job descriptor section.

The job manager fetches or coordinates fetching the job descriptor sections for the plurality of consumers, i.e., entities that process the fetched job descriptor sections. Each fetch request originates at a requesting agent that represents the consumer. Since there is a plurality of consumers for the fetch requests, i.e., the plurality of job descriptor sections for each of the processing devices, the reorder buffer architecture must ensure that any fetch response resulting from a fetch request can always be written into a space in the reorder buffer to prevent processing delays, e.g., when processing of a fetch response on behalf of one consumer temporarily blocks processing of a fetch response on behalf of another consumer, and/or prevent a reorder buffer deadlock, i.e., a state when progress of fetch response processing by the reorder buffer is permanently halted. Such a state arises due to system inter-consumer dependencies, i.e., a situation when a first consumer will not release a space in the reorder buffer until a second consumer makes progress. However, the second consumer cannot make progress processing, because the processing requires fetch request that cannot be issued because the entire reorder buffer space has been allocated. In addition, the reorder buffer architecture must ensure that the ordered data is returned to the consumer on behalf of which the data was requested.

To satisfy the requirements, the reorder buffer architecture known to one of ordinary skill in the art may use a separate reorder buffer statically allocated to each of the plurality of consumers. Alternatively, the reorder buffer's memory space may be partitioned into a plurality of entries, and each of the plurality of consumers is statically allocated at least one of the entries. A disadvantage of such static allocation means that even when one or more consumers is/are temporarily idle, the assigned reorder buffer entries of such idle consumers cannot be used by the other consumers. Therefore, to meet each consumers expected maximum bandwidth requirements, each consumer must be allocated sufficient number of entries. However, such a static allocation results in low utilization of the reorder buffer's memory space, therefore, requiring a large memory footprint and power consumption.

In another approach known to one of ordinary skill in the art, the job manager may attempt to coordinate the behavior of multiple consumers to allow dynamic allocation of the reorder buffer's memory space to avoid the temporary blocking or deadlock. However, such an approach requires detailed a priori knowledge of the plurality of consumers' behavior for each desired algorithm. Consequently, such a coordination is not a viable solution for a generic job manager managing arbitrary or large set of complex algorithms.

As discussed supra, to correctly process a response to the fetch request, a tag comprising information enabling association between the fetch request and returned data, delivery to the requestor, and other information known to a person of ordinary skill in the art may be sent together with a fetch command to the memory. Upon receiving the fetch request, the memory creates a response comprising the requested data in accordance with the content of the tag, and sends the response together with the tag back to the requesting entity. The reorder buffer then uses the tag information to write the data into the entry of the reorder buffer and uses the additional information from the tag to reorder the data.

As disclosed supra, to ensure mitigation of processing delays for a distributed job manager, wherein each individual job manager is managing multiple data processing devices, each comprising multiple ports, the amount of information to be included in the tag increases. At the same time, the size of the tag is limited, e.g., by the processing system architecture desiring to minimize interconnection wiring overhead, buffering requirements within the interconnection and memory hierarchy, interoperability with existing interconnect designs, and other limitations known to a person of ordinary skill in the art.

Accordingly, there is a need in the art for an implementation of a reorder buffer and method for use of the reorder buffer, providing a solution to at least the above identified problems.

SUMMARY

In an aspect of the disclosure, an apparatus and a method for reordering out-of-order responses to fetch requests from one or more memories into correct order according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1A:
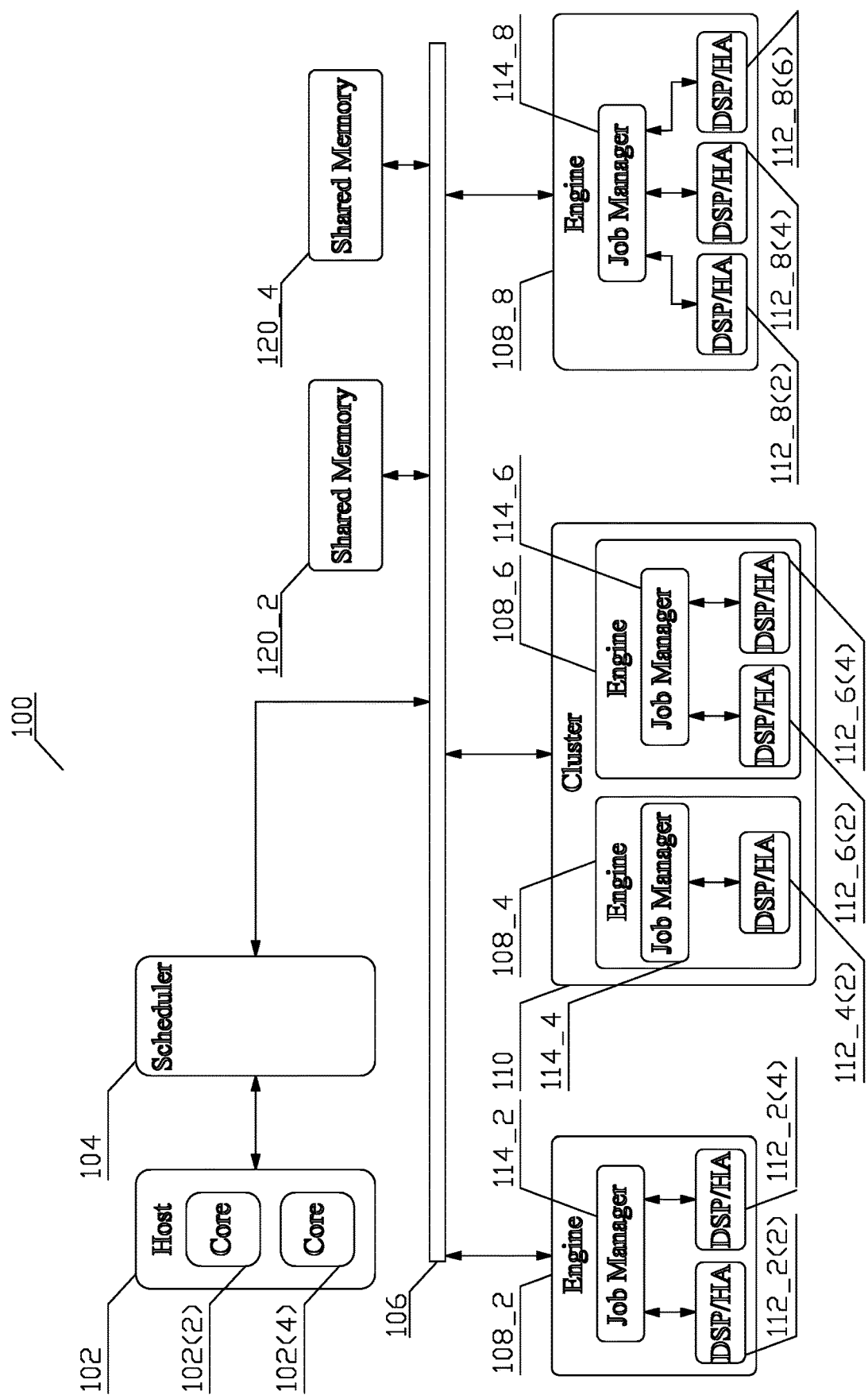
FIG. 1a depicts a conceptual structure of a system 100 comprising a configurable, scalable, distributed job management in accordance with aspects of this disclosure.
Figure 1B:
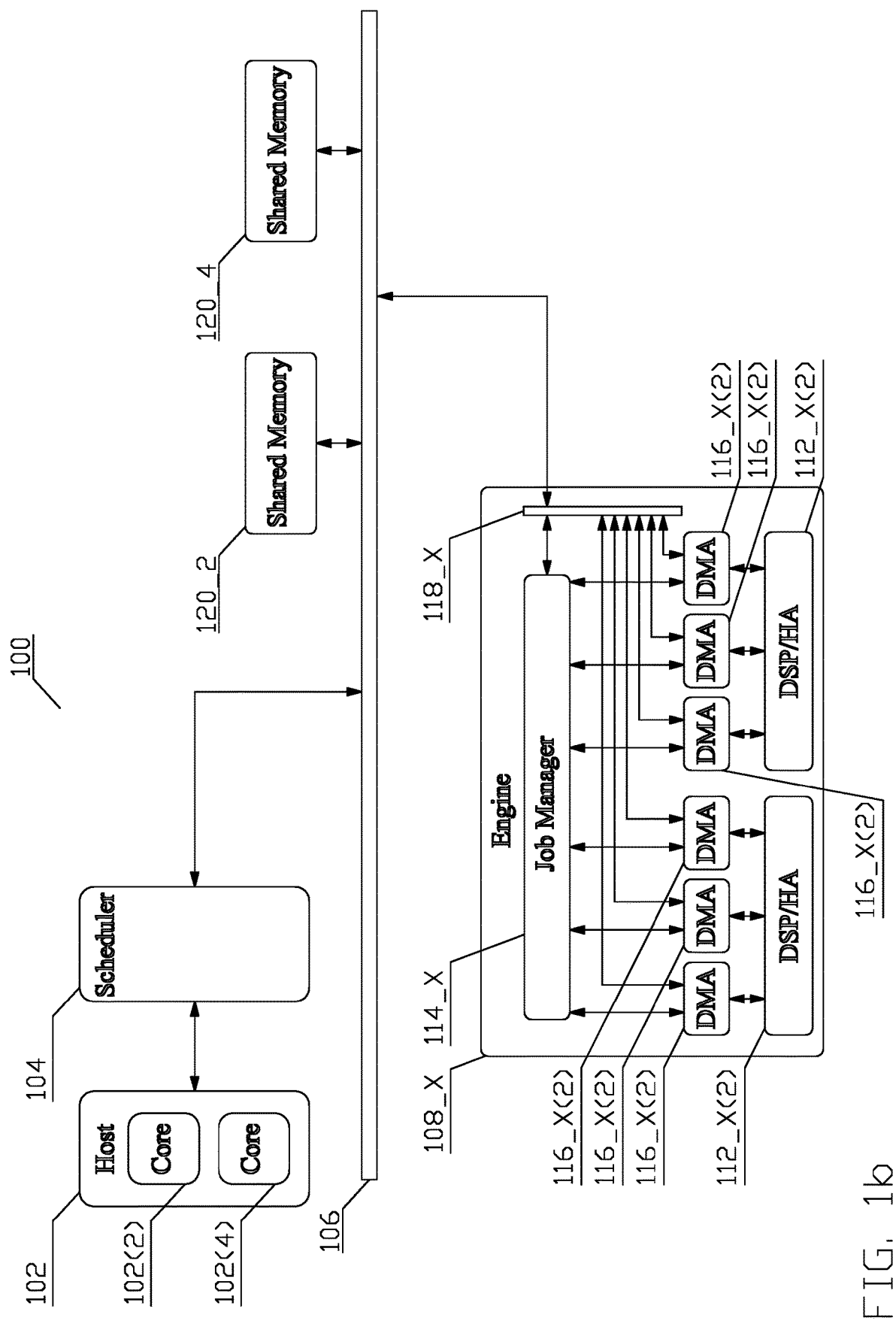
FIG. 1b depicts the conceptual structure of a system 100 in greater detail in regards of one of the sub-structures.
Figure 2A:
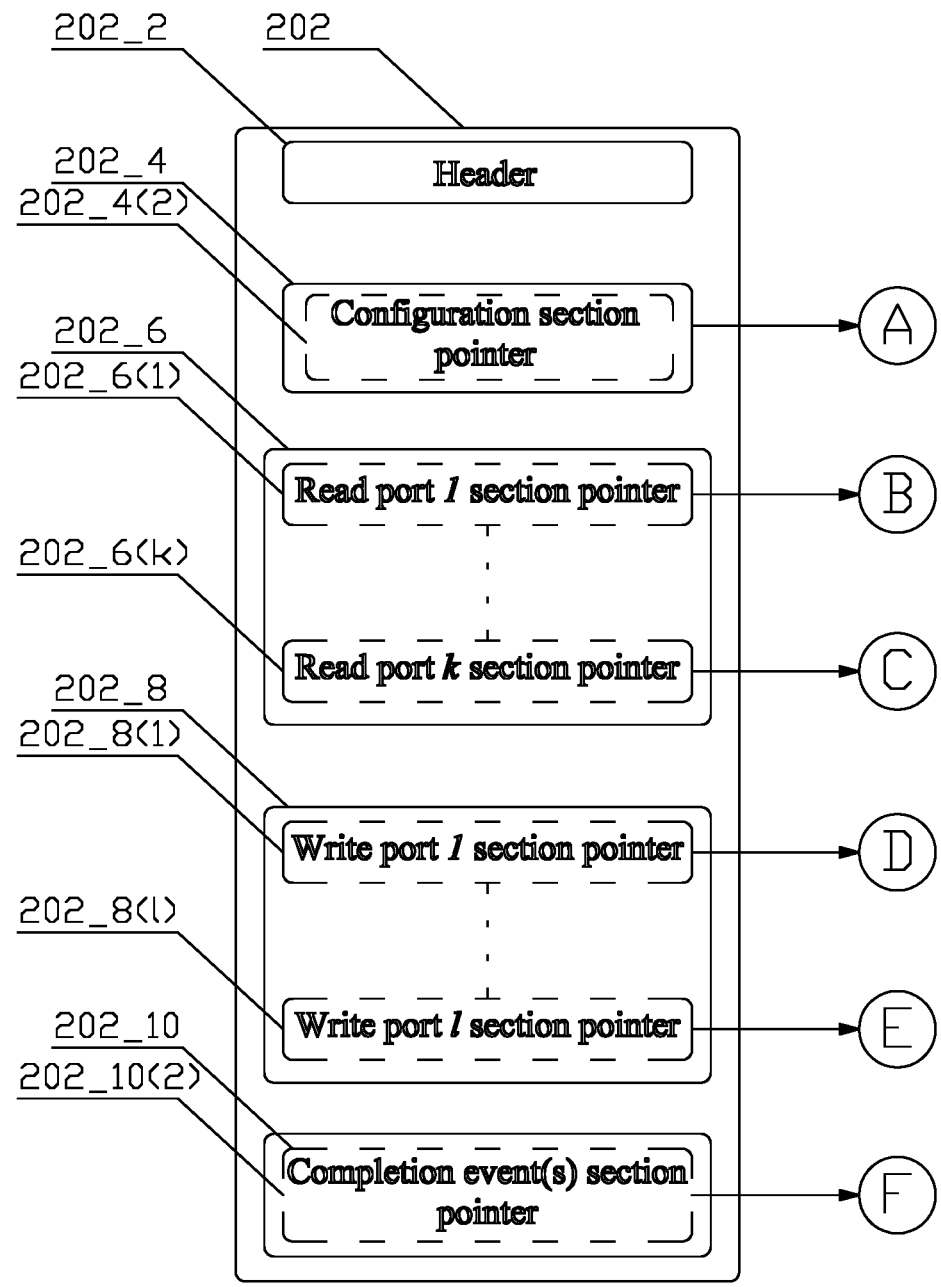
FIG. 2a depicts a first part of a block diagram of a conceptual structure 200 of a job descriptor in accordance with an aspect of this disclosure.
Figure 2B:
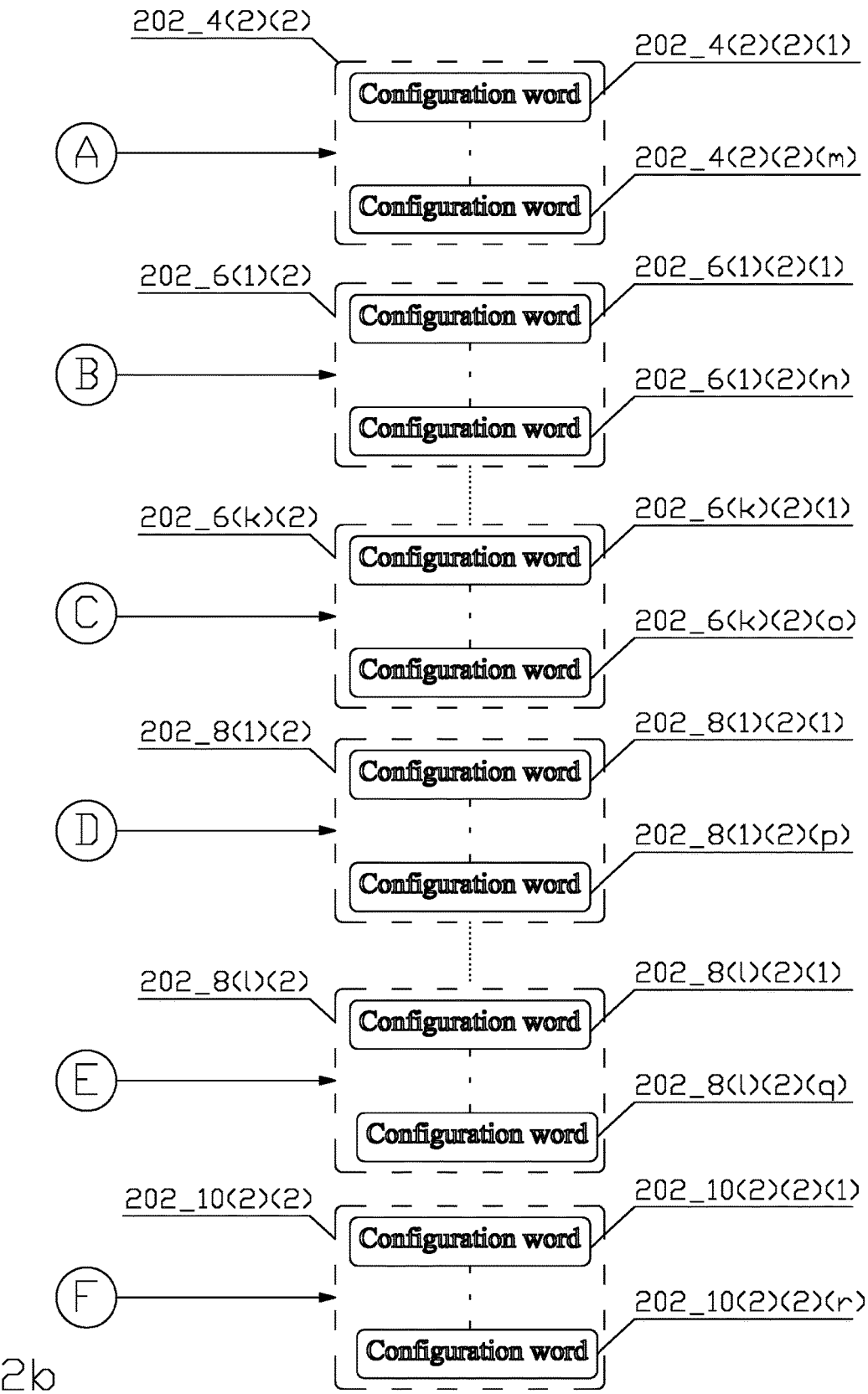
FIG. 2b depicts a second part of a block diagram of a conceptual structure 200 of a job descriptor in accordance with an aspect of this disclosure.

The description of like structural elements among the figures, is not repeated, the like elements have reference numerals differing by an integer multiple of 100, i.e., reference numeral 102 in FIG. 1a, 1b, becomes reference numeral 202 in FIG. 2; unless differences and/or alternative aspects are explicitly noted. An expression "_X" in a reference indicates an instance of an element of a drawing where helpful for better understanding. Any unreferenced single or double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 1a depicts a conceptual structure of a system 100 enabling configurable, scalable, distributed job management in accordance with aspects of this disclosure. The system 100 may be embodied as an assembly of one or more integrated circuits. The functionality of the depicted blocks and modules of the system 100 may comprise pure hardware entities, and/or hardware entities supporting execution of a firmware and/or software. As well known to a person of ordinary skill in the art, firmware is a type of software that provides control, monitoring and data manipulation of a hardware entity that executes the firmware. Unlike software, firmware is not meant to be changed, the reasons for changing firmware include fixing bugs or adding features to the hardware entity.

A job is a specific task to be performed by a resource. The job is represented by a job command, which may comprise, e.g., a job identifier and either a job descriptor or an indicator of a location of a job descriptor. The job identifier labels the identity of the job from the set of all the possible jobs. The job descriptor structure, an example of which is disclosed in greater detail in reference to FIG. 2 and associated text infra, comprises a plurality of sections, each comprising a plurality of configuration words that provide parameters for the job, descriptions of the input data for the job, descriptions of the output data to be produced by the job, and/or any other information relevant to the job as known to a person of ordinary skill in the art.

A host 102 comprising one or more controller cores 102(X) executing a control software initializes a programmable hardware scheduler module 104 that selects a job command representing a job from a plurality of jobs to be accomplished and dispatches the job command to a resource capable of the job command processing via a communication coupling 106. The communication coupling 106 may comprise a fully buffered crossbar switch, a bus, or any other communication coupling known to a person of ordinary skill in the art. In an aspect, the communication coupling 106 may comprise a cross-bar switch disclosed in a co-pending application entitled METHOD AND APPARATUS FOR MULTIPLE ACCESS OF PLURAL MEMORY BANKS, filed on Aug. 2, 2012, application Ser. No. 13/565,735. The selection of the resource is controlled by the programmable hardware scheduler module 104, designed according to criteria, including, but not being limited to the timing of job submission, control flow between jobs, job status logging, and various other support functions known to a person of ordinary skill in the art. In an aspect, the scheduling may be carried out according to aspects disclosed in a co-pending application entitled METHOD AND APPARATUS FOR LOAD BALANCING OF JOBS SCHEDULED FOR PROCESSING, filed on May 20, 2017, application Ser. No. 15/600,706.

A resource ultimately responsible for processing the job command comprises one of a plurality of engines 108_X. As depicted in FIG. 1a, a subset of the plurality of the engines 108_X, e.g., engines 108_4, 108_6, is organized into and implemented in hardware as one or more physical clusters 110, sharing one or more resources, e.g., a common data path, i.e., bandwidth, a memory, and other shared resource known to a person of ordinary skill in the art. The engines 108_X not belonging to the at least one subset stand alone, e.g., engines 108_2, 108_8. However, other organizations of the resources, i.e., all engines 108_X being stand alone, or all engines 108_X being organized into one or more physical clusters 110 are contemplated. Additionally, as disclosed in the above-referenced application METHOD AND APPARATUS FOR LOAD BALANCING OF JOBS SCHEDULED FOR PROCESSING, to properly manage load balancing due to a fixed nature of the structure of the physical cluster as well as due to the difference between the structure of a cluster and a stand-alone engine, the control software may organize any of the engines 108_X, regardless of their status of belonging to a physical cluster 110 or stand alone, into one or more virtual clusters (not shown).

Any engine 108_X may comprise at least one data processing device 112_X(X) and a job manager 114. The plurality of data processing devices comprises digital signal processors (DSP) and/or hardware accelerators (HA). A DSP is a specialized processor, the architecture of which is optimized for the operational needs of digital signal processing, i.e., numerical manipulation of digital signals; a HA comprises a firmware controlled hardware device or a pure hardware device, i.e., a device not requiring any firmware, designed to perform a plurality of data processing functions in accordance with configuration parameters for the data processing device. Such data processing functions may comprise, e.g., Viterbi decoder, fast Fourier transform, and other functions known to a person of ordinary skill in the art, and the configuration parameters may comprise, e.g., size of the fast Fourier transform, turn on or off parts of the algorithm pipeline, and other configurable parameters known to a person of ordinary skill in the art.

FIG. 1b depicts the conceptual structure of a system 100 with a detailed conceptual structure of an engine 108_X. The movement of data to and from the engine 108_X may comprise any means known to a person of ordinary skill in the art. In one aspect, such means is implemented by means of a Direct Memory Access (DMA) engine 116_X(X). Each physical read port and/or write port at each DSP or HA 112_X(X) is communicatively coupled to an associated DMA engine 116_X(X), which accesses data external to the engine 108_X via a communicative coupling 118_X internal to the engine 108_X, and communicative coupling 106.

Each job manager 114_X is responsible for coordinating progress of the scheduled jobs for an associated engine 108_X; thus, the task of coordination of progress of scheduled jobs is distributed among a plurality of job managers 114_X. The job manager 114_X may comprise a firmware controlled hardware entity, a pure hardware entity, i.e., an entity not requiring any firmware, or a software entity executing on a processor. Upon receiving the job, the job manager 114_X of the engine 108_X selected by the scheduler module 104 selects a specific DSP or HA 112_X(X) in accordance with a load balancing criteria and administers the job descriptor for the assigned job command. The administration comprises retrieval of the job descriptor and dispatch of the job descriptors to the appropriate DSP(s) or HA(s) 112_X(X) and to the appropriate DMA engine(s) 116_X(X) in-order. In one aspect, the job command comprises the job descriptor, in other aspect, the job command comprises a pointer to a location of the job descriptor in one of the one or more shared memories 120_X. A shared memory comprises a memory that may be shared by a plurality of resources. Although two shared memories 120_2, 120_4 have been depicted, the system 100 may comprise a different number of shared memories (including a single memory) with different organization and properties.

An exemplary conceptual structure of a job descriptor 202 is disclosed in FIG. 2. The job descriptor 202 comprises a header section 202_2, comprising data describing the job, e.g., number of read and/or write ports, interrupt setting, job timer settings, specific configuration parameters for the DSPs and/or HAs (112_X(X)), and other data known to a person of ordinary skill in the art.

The header section 202_2 may be followed by at least one job descriptor section 202_X. As depicted, each of the job descriptor section 202_X comprises one or more pointers, namely, a configuration section pointer 202_4(2), a plurality of read port section pointers 202_6(1)-202_6(k), a plurality of write port section pointers 202_8(1)-202_8(k), and a completion event(s) section pointer 202_10(2).

Each of the sections' 202_X pointers 202_4(2), 202_6(1)-202_6(k), 202_8(1)-202_8(k), 202_10(2) identifies a location 202_4(2)(2), 202_6(1)(2), 202_6(k)(2), 202_8(1)(2), 202_8(k)(2), 202_10(2)(2) in the one or more shared memories, where a sequence of a plurality of configuration words for the corresponding job descriptor section are stored. The format and interpretation of the configuration words can differ between the sections, and depends on the design and implementation of the DSPs and/or HAs (112_X(X)) and the job manager (114_X).

The configuration section location 202_4(2)(2) comprises configuration words 202_4(2)(2)(1)-202_4(2)(2)(m) that consist of parameters and initial settings for the DSPs and/or HAs (112_X(X)) to carry out the job-related tasks.

For each of the read port section location 202_6(1)(2)-202_6(k)(2), the first plurality of configuration words 202_6(1)(2)(1)-202_6(k)(2)(o) designates a second plurality of DMA commands that program a read DMA port to read data from a specific location(s) in the one or more memories. Each DMA command may comprise, e.g., a memory address, a size of data to be fetched, a particular pattern of data to be fetch, and other such parameters known to one skilled in the art.

Similarly, each of the write port section location 202_8(1)(2)-202_8(1)(2) comprises a first plurality of configuration words 202_8(1)(2)(1)-202_8(1)(2)(q) that designate a second plurality of DMA commands that program a write DMA port to write output data from the job to specific location(s) in the one or more memories.

The relationship between DMA command(s) and designating configuration word(s) depends on the complexity of a DMA command and length of the configuration word. Thus, the relationship may be one-to-one, one-to-many, or many-to-one.

The completion event(s) section location 202_10(2)(2) comprises configuration words 202_10(2)(2)(1)-202_10(2)(r) that compose instructions for actions for the DSPs and/or HAs (112_X(X)) and/or the job manager (114_X) to carry out upon the completion of processing a job.

In such aspect, the job manager (114_X) must manage first fetch requests for the different sections 202_X from the job descriptor 202, and then fetch requests for the configuration words, corresponding to the locations pointed by the pointers 202_4(2), 202_6(1), 202_6(k), 202_8(1), 202_8(1), and 202_10(2). The fetch requests are generated by requesting agents, i.e., entities requesting the data on behalf of a consumer of the data. The requesting agents may comprise, e.g., the DSPs or HAs 112_X(X), the DMA engines 116_X(X), and/or other components within the job managers (114_X). The consumers may comprise the physical ports of the DSPs or HAs (112_X(X)), and/or configuration ports for the DMA engines (116_X(X)) and/or other component(s) within the job manager (114_X), e.g., an entity for processing job completion events. In one aspect, a requesting agent requests data on behalf of a consumer; in another aspect, a requesting agent requests data on behalf of a plurality of consumers.

A person of ordinary skill in the art appreciates that other structures of job descriptor 202 are contemplated. Thus, by means of an example, the configuration words in the header section 202_2 do not need to compose parameters, initial settings, or DMA commands, but may compose further indirection pointers that describe location(s) in the one or more memories where such parameters, settings or DMA commands are located. Similarly, any of the sections may be empty and may not be comprised of any configuration words. In that respect, consider an implementation of a job descriptor, which comprises a fixed number of sections for each of the DSPs or HAs (112_X(X)). Since certain jobs may not require all the sections, e.g., a specific HA (112_X(X)) may comprise two physical ports, but a specific job does not require use one of the ports, consequently, the job descriptor section for the unused port is an empty, i.e., a zero-sized section. Similarly, instead of the job descriptor section containing a pointer which identifies the location of the configuration words for the section, the job descriptor section may directly contain the configuration words, without the need for an indirection pointer. Similarly, the job descriptor section pointer may comprise an indirection pointer and additional parameters specifying, e.g., the size of the number of configuration words, and other such parameters known to one skilled in the art.

Each DSP or HA 112_X(X) may support multiple jobs. Each of the multiple jobs is described by a job descriptor, which may comprise a plurality of sections, wherein each section comprises a sequence of configuration words either for the DSP or HA 112_X(X), or for one of the plurality of DMA engines 116_X(X). Consequently, the job manager 114_X must ensure dispatch of the fetched configuration words from each section of the different job descriptors to the appropriate DSP(s) or HA(s) 112_X(X) and to the appropriate DMA engine(s) 116_X(X) in-order. However, since the interface between the one or more shared memories 120_X and the job managers 114_X is optimized for efficiency; the fetch responses returned from the one or more shared memories 120_X do not need to be returned in the order in which the different fetch requests were issued. To reorder data which is received in the fetch responses out-of-order in relation to the order in which the fetch requests were issued, a reorder buffer, a small memory structure local to each job manager 114_X, is used.

As disclosed supra, each of the one or more shared memories 120_X may have different organization and properties. By means of an example, one memory may be a dynamic random-access memory (DRAM), with caches that are optimized for, e.g., 128 bytes access; another memory may be a static random-access memory (SRAM) memory optimized for 128 bit access. To facilitate efficient processing of requests from a plurality of consumers, mitigate temporary blocking or prevent deadlock, and support a plurality of memories with different access granularities, and maximize utilization of the reorder buffer's memory space, a conceptual structure of reorder buffer 316 in accordance with an aspect of this disclosure is disclosed in FIG. 3.

Figure 3A:
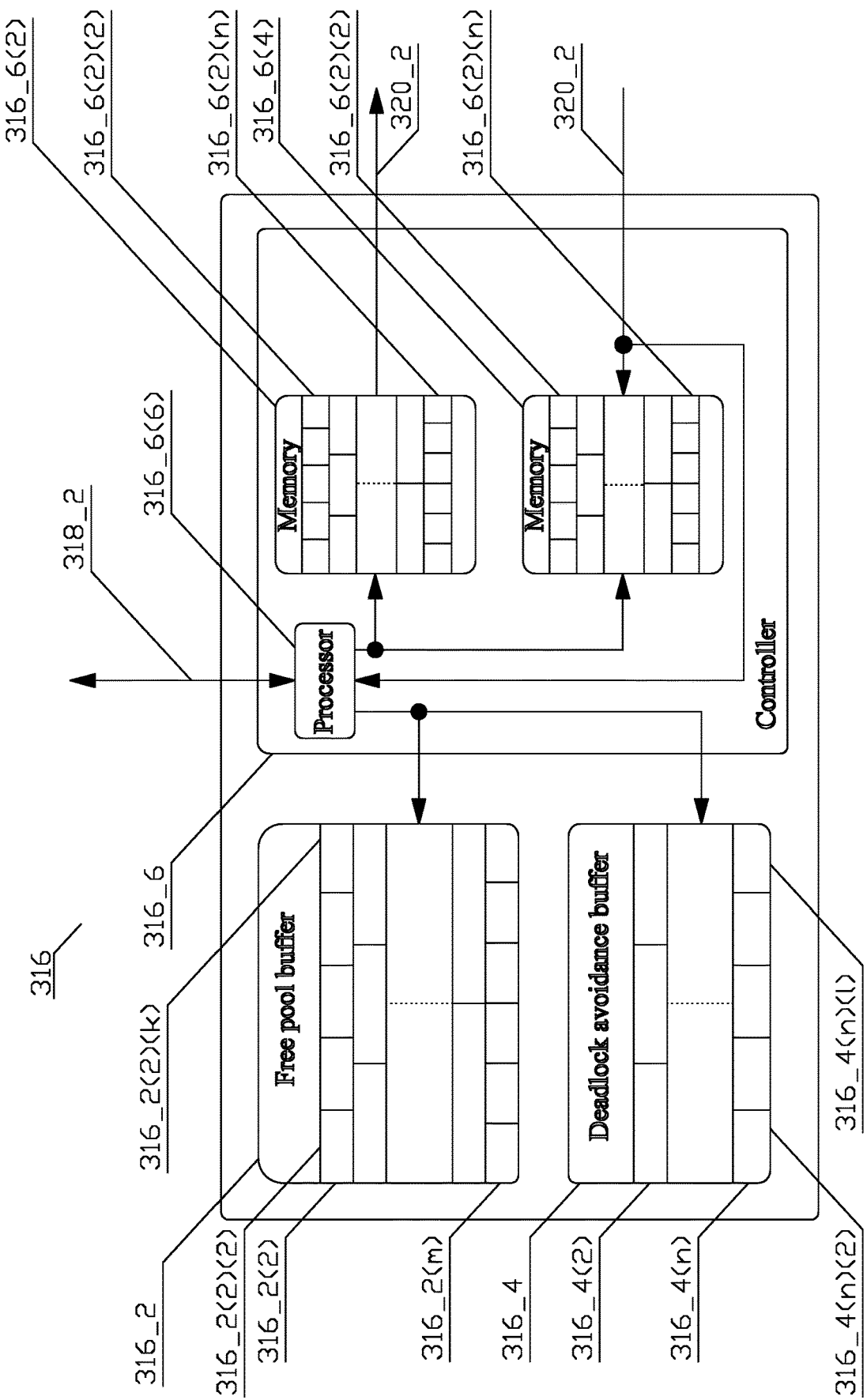
FIG. 3a depicts a conceptual structure of a reorder buffer 300 in accordance with an aspect of this disclosure.

Referring to FIG. 3, the reorder buffer 316 comprises two segregated logical memory structures, a free pool buffer 316_2 and a deadlock avoidance buffer 316_4. The logical memory structures are understood to comprise, for example, two physically separate memory structures, or a common physical memory structure that has been logically divided into two logical structures.

The free pool buffer 316_2 comprises a first logical memory structure from which a space for an entry 316_2(X) is allocated in response to fetch requests received from any of the requesting agent(s), regardless of the consumer on a behalf of which the requesting agent acts. Once the fetch response processing is concluded, the corresponding entry 316_2(X) is deallocated and returned to the free pool buffer 316_2. Such a shared structure of the free pool buffer 316_2 enables an allocation of the entries 316_2(X) among the consumers on per needed basis. Consequently, the number of entries 316_2(X) for a specific consumer dynamically increases and decreases based on the number of fulfilled fetch requests. Such a dynamic allocation enables high utilization of the given logical memory space, therefore, ensuring a smaller memory footprint and power consumption.

Each entry 316_2(X) is a group comprising a logical organization of one or more items (316_2(X)(X)). The size of a group is selected to match a simple proper fraction of the largest access size of the one or more memories. In one aspect, the simple proper fraction is 1. The size of each item is selected to match the size of the smallest fetch request issued by the controller (316_6). In the degenerate case, a group 316_2(X) might comprise just one item (316_2(X)(X)) if all the fetch requests are expected to be of the same size, e.g., in case of only a single shared memory 120 or when all shared memories 120_X share the same access size. Each item (316_2(X)(X)) may comprise one or more configuration words (not shown), in accordance with the size of the data to be returned in response to the fetch request. These entries 316_2(X) are available to store information received as a response to at least one fetch request caused to be issued by the job manager 114 processing the job described by the job descriptor, as disclosed in greater detail infra.

To prevent the above-disclosed permanent halting of progress of a fetch response processing by the reorder buffer 316, a deadlock avoidance buffer 316_4 is introduced. The deadlock avoidance buffer 316_4 comprises a second logical memory structure, divided into a plurality of n divisions 316_4(X) wherein each of the divisions 316_4(X) may comprise one or more entries, each comprising one or more groups 316_4(X)(X). Like with the free pool buffer 316_2, each group 316_4(X)(X) comprises a logical organization of one or more items (not shown), which may comprise one or more configuration words (not shown).

The number of divisions 316_4(X) n is determined to accommodate n different consumers of fetch requests. Under certain circumstances, each job descriptor section may be provided to a different port on a DSP/HA 112_X(X), or to a DMA engine associated with a DSP/HA. By means of an example, if the job descriptor comprises 1 configuration section, r read DMA port sections, w write DMA port sections, and 1 completion event(s) section, then each of these sections represents data to be requested. If the engine 108_X comprises m DSPs and/or HAs 112_X(X), then there are n=m×(1+r+w+1) consumers. The correct operation of the reorder buffer 316 requires that each consumer is associated with one division in the deadlock buffer 316_4. In one aspect, the control software executing on the host 108 ascertains the number of active consumers in accordance with an algorithm to be executed and partitions the deadlock avoidance buffer into the number of divisions 316_4(X) corresponding to the number of active consumers. An active consumer comprises a consumer, for which a requesting agent will request data while the algorithm is being executed by the digital data processing system. In another aspect, the deadlock avoidance buffer is fixedly partitioned into n=m× (1+r+w+1) divisions 316_4(X), i.e., the total number of consumers.

Since each consumer is statically assigned a division in the deadlock avoidance buffer 316_4, blocking one consumer by another consumer is avoided, thus guaranteeing forward progress for all consumers.

The reorder buffer 316 configuration parameters, e.g., sizes of the free pool buffer 316_2 and the deadlock avoidance buffer 316_4, and the number of groups 316_4(X)(X) per a division 316_4(X) is determined in accordance with the hardware architecture design parameters, e.g., system memory bus width, maximum allowed latency, and other parameters known to a person of ordinary skill in the art to ensure minimum performance requirements. The configuration parameters may be fixed; alternatively, the control software executed by the host (102) may dynamically change the configuration parameters in accordance with the operating condition of the system, e.g., the number and/or type of DSP or HA (112_X(X)) used by a processing algorithm.

The reorder buffer 316 is managed by a controller 316_6, a function of which is managed by a controller logic 316_6(6), is communicatively coupled 318_X with the job manager (114) and communicatively coupled 320_X with the one or more shared memories (120_X). The controller 316_6 comprises two segregated logical memory structures. The first logical memory structure 316_6(2) is organized into a plurality of n ordering first-in-first-out (FIFO) buffers (316_6(2)(X)), with one FIFO associated with each consumer. The second logical memory structure 316_6(4) is organized into a plurality of n pending request arrays (316_6(4)(X)), with one array associated with each consumer. Each fetch request is allocated an entry in one ordering FIFO buffer (316_6(2)(X)) and an entry in one pending request array (316_6(4)(X)) as disclosed in greater detail in FIG. 4 and associated text.

As a consequence of organizing the reorder buffer (316) into constant size groups, the size of the ordering FIFO buffers (316_6(2)(X)) and the pending request arrays (316_6(4)(X)) are significantly reduced since each of the constant size groups is represented by one entry, instead of each item (of the free pool buffer (316_2) and one division of the deadlock avoidance buffer (316_4)) being represented by one entry. Such a reduction of the size of the FIFO buffers (316_6(2)(X)) and the pending request arrays (316_6(4)(X)) results in reducing the required area of the first logical memory structure 316_6(2) and the second logical memory structure 316_6(4).

FIG. 4 depicts a flow chart of a process for reassembling out-of-order information into correct order. The process comprises three processes executing in parallel.

Figure 4A:
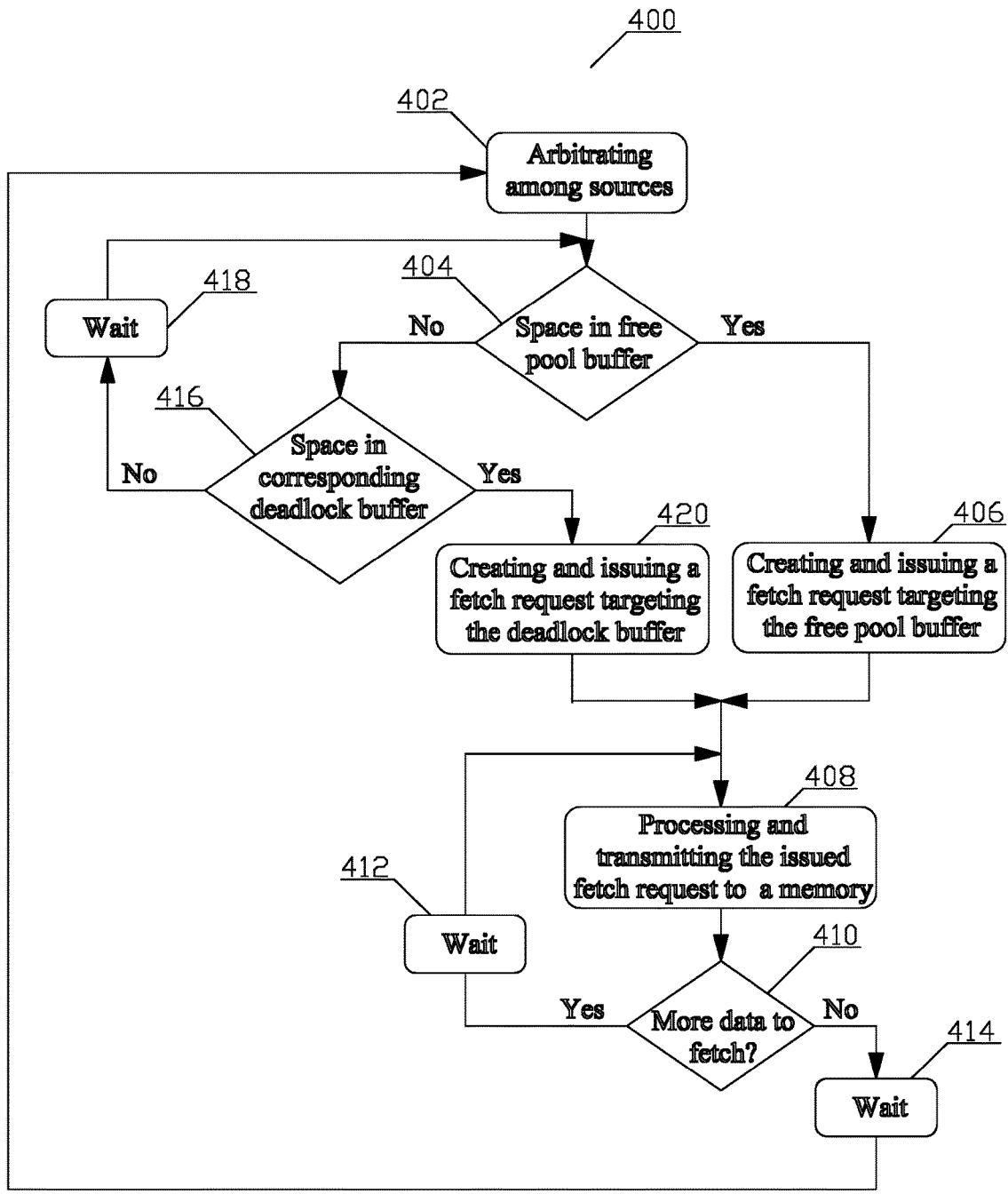
FIG. 4a depicts a first part of a flow chart of a process for reassembling out-of-order information into correct order in accordance with aspects of this disclosure.

Referring to FIG. 4a, the first process creates and issues fetch request(s). Upon the process start, in block 402, requesting agent(s) representing consumers that want to request access to the one or more memories submit fetch request(s) to the job manager (114). The job manager (114) arbitrates among the submitted fetch requests to select one fetch request. The arbitration may comprise, e.g., round-robin, priority weighted, and other arbitration methods known to a person of ordinary skill in the art. Once the fetch request is selected, the job manager (114) is ready to cause issuance of at least one fetch request to one of the one or more shared memories (120_X) to be accessed. The process continues in block 404.

In block 404, the job manager (114) determines whether there is space in the free pool buffer (316_2) of the reorder buffer (316). The process continues in block 406 when the determination is positive; the process continues in block 416 when the determination is negative.

In block 406, the job manager (114) either formats and issues a fetch request or issues a fetch request with instructions how to format the fetch request to the controller (316_6). To this end, the job manager (114) determines in accordance with the access size of the one of the one or more shared memories (120_X) to be accessed, the size of the group (316_2(X)), and the size of the section of a job descriptor (B02) to be fetched, whether the fetch request can be issued as a single segment or needs to be divided into a plurality of segments.

By means of an example, when the size of the group (316_2(X)) in the free buffer (316_2) and the deadlock avoidance buffer (316_4) is 128 bytes, the size of each item is 128 bits, and the size of the data to be requested is 128 bytes, the job manager (114) allocates one group. When the one of the one or more shared memories (120_X) to be accessed is the DRAM, the job manager (114) causes issuance of a single 128-byte fetch request. When, on the other hand the one of the one or more shared memories (120_X) to be accessed is the SRAM, the job manager (114) causes issuance of eight 128-bit segments of the fetch request, with each segment resulting in return of one item.

By means of another example, when the size of the group in the free buffer (316_2) and the deadlock avoidance buffer (316_4) is 128 bytes, the size of each item is 128 bits, and the size of the data to be requested is 256 bits, the job manager (114) allocates a single group. When the one of the one or more shared memories (120_X) to be accessed is the DRAM, the job manager (114) causes issuance of one 256-bit fetch request. When, on the other hand the one of the one or more shared memories (120_X) to be accessed is the SRAM, the job manager (114) causes issuance of two 128-bit segments of the fetch request, each segment resulting in return of one item.

When the determination is positive, in one aspect, the job manager (114) provides via a communication coupling (318_2) to the controller (316_6) the one or more segments of the fetch request. In another aspect, the job manager (114) provides to the controller (316_6) the fetch request and instruction how to segment the fetch request. When the determination is negative, the job manager (114) provides to the controller (316_6) the fetch request. The process continues in block 408.

In block 408, the controller (316_6) creates for each fetch request an entry (316_2(X)) by allocating space equal to the size of the group in the free pool buffer (316_2) and a destination buffer identifier. Such an identifier may comprise, e.g., a tuple, a first member of which is an identifier of the structure of the reorder buffer (316), i.e., the free pool buffer (316_2); a second member of which is an identifier of the entry (316_2(X)), e.g., an address of a location of the entry (316_2(X)) in the free pool buffer (316_2).

The controller (316_6) further creates for each fetch request an entry in an ordering first-in, first-out (FIFO) buffer (316_6(2)) associated with the selected consumer in the order of the fetch request arrival; the entry comprising at least the identifier of the destination buffer, i.e., the free pool buffer (316_2) or the deadlock avoidance buffer (316_4) of the reorder buffer (316), but may also comprise some or all of the information assisting effective delivery of the data from the reorder buffer (316) to the consumer as described supra.

The controller (316_6) further creates an entry in the pending request array (316_6(4)) associated with the selected consumer; the entry comprising at least the information concerning the state of the request, i.e., size of the request, size of the data yet to be returned, and a ready bit. The ready bit indicates whether the data is ready to be transferred from the reorder buffer (316) to the consumer. The value of ready bit is initialized to a first value indicating not ready.

The controller (316_6) then examines the information received from the job manager (114) and accordingly either creates or processes the one or more segments of the fetch requests. Each segment of the fetch request comprises, e.g., an identifier of data to be fetched, i.e., an address in the shared memory (120_X), a size of the segment, and a descriptor enabling processing of the segment and a response returned from the shared memory (120_X). In one aspect, the descriptor comprises a tag, i.e., information needed to enter the data returned from the shared memory (120_X) into the correct structure of the reorder buffer (316) and, optionally, any other information assisting effective delivery of the data from the reorder buffer (316) to the consumer.

The content of the information needed to enter the data returned from the shared memory (120_X) into the correct structure of the reorder buffer (316) may comprise, e.g., the destination buffer identifier in the reorder buffer (316), an identifier of the requestor, an identifier of a specific group within either the free pool or deadlock avoidance buffer, and an identifier of an item in the group. The identifier of the requestor may comprise an identifier or the requesting agent, which maps to the consumer, or the consumer itself, together with an identifier of a specific job descriptor section.

The information assisting effective delivery of the data from the reorder buffer (316) to the consumer comprises a job identifier associated with a section of the job descriptor being fetched and a byte offset indicating the start of the desired data within the response to the fetch request. The need for the byte offset is due to the structure of the reorder buffer 316, namely, the group and item size. By means of an example, should the item size be 128 bit, but the consumer requires only the last 64 bits, the byte offset is set to a value of 8. A person of ordinary skill in the art will understand that a different scale, i.e., bits instead of bytes may be used.

The controller (316_6) then forwards the one or more segments of the fetch request including the tag comprising at least the destination buffer identifier in the reorder buffer (316) and the consumer identifier via a communication coupling (320_2) to the shared memory (120_X). The process continues in block 410.

In block 410, the controller (316_6) determines for each of the requestors whether more data needs to be fetched in accordance with the total size of the job descriptor and the total size of the one or more segments issued so far. The controller (316_6) then provides result of the determination to the job manager (114). When the determination is positive, the process continues in block 412; when the determination is negative, the process continues in block 414.

In block 412, the process may enter a wait state before processing next of the one or more segments' fetch requests. Such a wait may account for, e.g., congestion of the path between the controller (316_6) and the shared memory (120_X), the shared memory (120_X) serving another request, and other conditions known to a person of ordinary skill in the art. The process then returns to block 408.

In block 414, the process enters a wait state before one or more segments of the next fetch request. Such a wait may account for, e.g., for congestion of the path between the requestor and the shared memory (120_X), the memory serving another request, and other conditions known to a person of ordinary skill in the art. Upon detecting that a requestor requires a fetch request, the process returns to block 402.

In block 416, following a determination in block 404, that there is no space available in the free pool buffer (316_2), the job manager (114) determines whether there is an unallocated group in the division (316_4(X)) of the deadlock avoidance buffer (316_4). The process continues in block 418 when the determination is negative; the process continues in block 420 when the determination is positive.

In block 418, the process enters a wait state before returning to the block 404. The wait state may terminate upon occurrence of an external event, i.e., determination that there is space available in the reorder buffer (316) by, e.g., indication from block 442 that data has been transferred from the reorder buffer (316), thus making an entry available.

In block 420, the job manager (114) determines in accordance with the access size of the one of the one or more shared memories (120_X) to be accessed, the size of the group (316_2(X)), and the size of the section of a job descriptor (B02) to be fetched, whether the fetch request needs to be divided into a plurality of segments. When the determination is positive, in one aspect, the job manager (114) provides via a communication coupling (318_2) to the controller (316_6) the segments of the fetch request. In another aspect, the job manager (114) provides to the controller (316_6) the fetch request and instruction how to segment the fetch request. When the determination is negative, the job manager (114) provides to the controller (316_6) the fetch request. The process continues in block 408.

In block 408, the controller (316_6) proceeds as disclosed supra, except that the controller (316_6) allocates a group in the division (316_4(X)) of the deadlock avoidance buffer (316_4) associated with the requestor and then the controller (316_6) proceeds as disclosed in description of the processing in block 408 supra. The process continues in block 410 and subsequent blocks as disclosed supra.

Figure 4B:
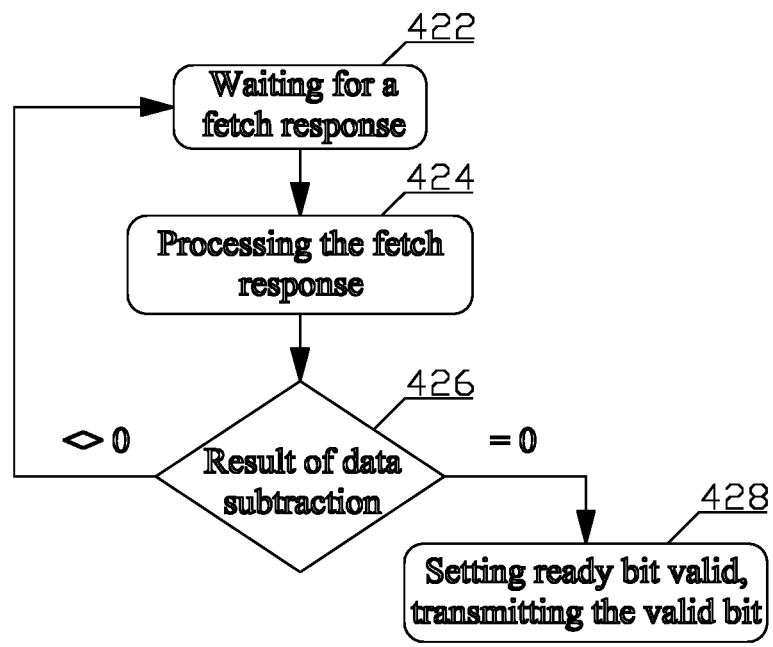
FIG. 4b depicts a second part of the flow chart of a process for reassembling out-of-order information into correct order in accordance with aspects of this disclosure.

Referring to FIG. 4b, the second process manages a response to the fetch request(s) created and issued by the first process disclosed in FIG. 4a, i.e., the transfer of the data returned by the shared memory (120_X) via communicative coupling (320_4) to the correct structure of the reorder buffer (316) and preparation of the returned data for transfer to the consumer. The second process is started and executed in parallel with the first process. Upon starting the process, in block 422 the process enters a wait state accounting for delay due to, e.g., waiting for the first process disclosed in FIG. 4a to create and issue fetch request(s), delay of an interconnect to the shared memory (120_X), delay of accessing the shared memory (120_X), including a delay due to the shared memory (120_X) serving another request, and delay of traversing the interconnect to receive response, as well as other delays known to a person of ordinary skill in the art. Upon detecting that the shared memory (120_X) processed a fetch request (320_2) and returned a fetch response (320_4) comprising the requested data together with the tag to the controller (316_6), the process exits the wait state and continues in block 424.

In block 424, the controller (316_6) separates the requested data from the tag and uses the tag information to process the requested data by writing the requested data into a corresponding address location in the free buffer section (316_2) or the deadlock avoidance buffer section (316_4) indicated by the destination buffer identifier, and updating the entry in a pending request array (316_6(4)) corresponding to the source that issued the request. The correct address location is determined in accordance to the identifier of the item in the group. Thus, continuing with the example supra, for the 128-byte response from DRAM, the controller (316_6) starts writing data into the first item of the group and continues writing data into consecutive items within that group until all 128 bytes have been written.

Alternatively, for the SRAM 128-bit response is received, the controller (316_6) starts writing to the single item in the group indicated by the identifier of the item in the group.

Updating the entry comprises subtracting the size of the data returned by the shared memory (120_X) from the size of the request remaining in the pending request array (316_6(4)). The entry in the pending request array (316_6(4)) is updated with the result of the subtraction. The result will be zero once all responses for that group have been received. The process continues in block 426.

In block 426 the result of the subtraction is examined. When the result of the subtraction is not equal to zero, i.e., not all the items for the requested data have been returned, the process returns to block 422; otherwise, when the result of the subtraction is equal to zero, i.e., all the items for the requested data have been returned, the process returns to block 428.

In block 428, the ready bit entry in the pending request array (316_6(4)) is set to a value indicating ready and the controller (316_6) sends a ready bit (318_6) to the job manager (114).

Figure 4C:
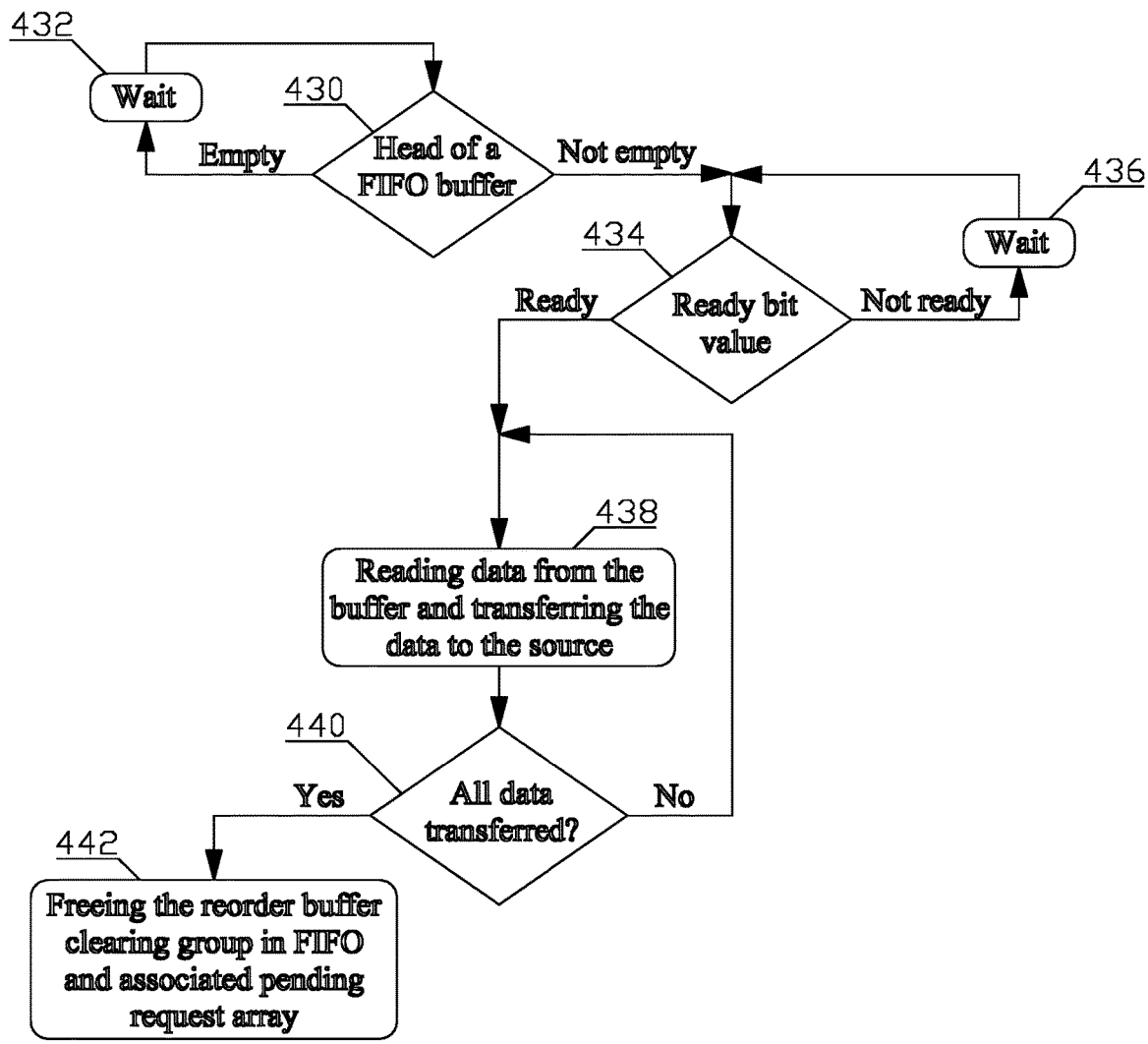
FIG. 4c depicts a third part of the flow chart of a process for reassembling out-of-order information into correct order in accordance with aspects of this disclosure.

Referring to FIG. 4c, the third process manages transfer of the data from the reorder buffer (316) to the consumer. The third process is started and executed in parallel with the first and the second processes for each active consumer. Upon start of the process, in block 430 the job manager (114_X) examines the content of a head of the ordering FIFO buffer (316_6(2)). When the content of the head of the ordering FIFO buffer (316_6(2)) is empty, i.e., there are no fetch requests outstanding and no fetch responses for the group pending to be delivered, the process continues in block 432; otherwise the process continues in block 434.

In block 432, the process enters a wait state before returning to the block 430. The wait state may terminate after a specific time or upon occurrence of an external event, e.g., the head of the ordering FIFO buffer (216_6(2)) is non-empty, i.e., contains a group identifier of a fetch request, indicating pending response to the fetch request.

In block 434, the job manager (114_X) determines a value of the ready bit (318_6) in the pending request array corresponding to the head of the ordering FIFO. When the value indicates non-ready, the process continues in block 436, when the value indicates ready, the process continues in block 438.

In block 436, the process enters a wait state before returning to the block 434. The wait state may terminate after an occurrence of an external event, e.g., the ready bit (318_6) being set to a value indicating ready.

In block 438, the job manager (114_X) transfers the data from the free pool buffer section (316_2) or the deadlock avoidance buffer section (316_4) in accordance with the destination buffer identifier to the consumer of the request. When the response comprises a plurality of configuration words, the information required for effective delivery of the data from the reorder buffer (316) to the consumer, i.e., the byte offset and the request size stored in the pending request array may be used to select a portion of the data from the free pool buffer section (316_2) or the deadlock section (316_4). Additionally, information from the tag or from the ordering FIFO buffer (316_6(2)) may be used to perform additional error checking, and other operations, e.g., delivering a job identifier to the consumer along with the data. The process continues in block 440.

In block 440, the job manager (114_X) determines whether all the data has been transferred. If the determination is positive, the process continues in block 442; otherwise, the process returns to block 438.

In block 442, the job manager (114_X) frees the entry of the section of the reorder buffer (316) from which the data has been transferred, clears entry in the ordering FIFO buffer (316_6(2)), and clears entry in the associated pending request array (316_6(4)).

As disclosed supra, the reordering process uses tag information. Since the job manager 114 is distributed, serving multiple data processing devices 112_2, each comprising multiple ports, the amount of information to be included in the tag increases. Additionally, when a plurality of shared memories (120_X) are implemented additional information is needed to identify which of the memories (120_X) shall serve the request.

At the same time, the size of the tag is limited, e.g., by the system 100 architecture desiring to minimize interconnection, wiring overhead, buffering requirements within the interconnect and the one or more shared memories (120_X) hierarchy, interoperability with existing interconnect designs, and other limitations known to a person of ordinary skill in the art.

Figure 3B:
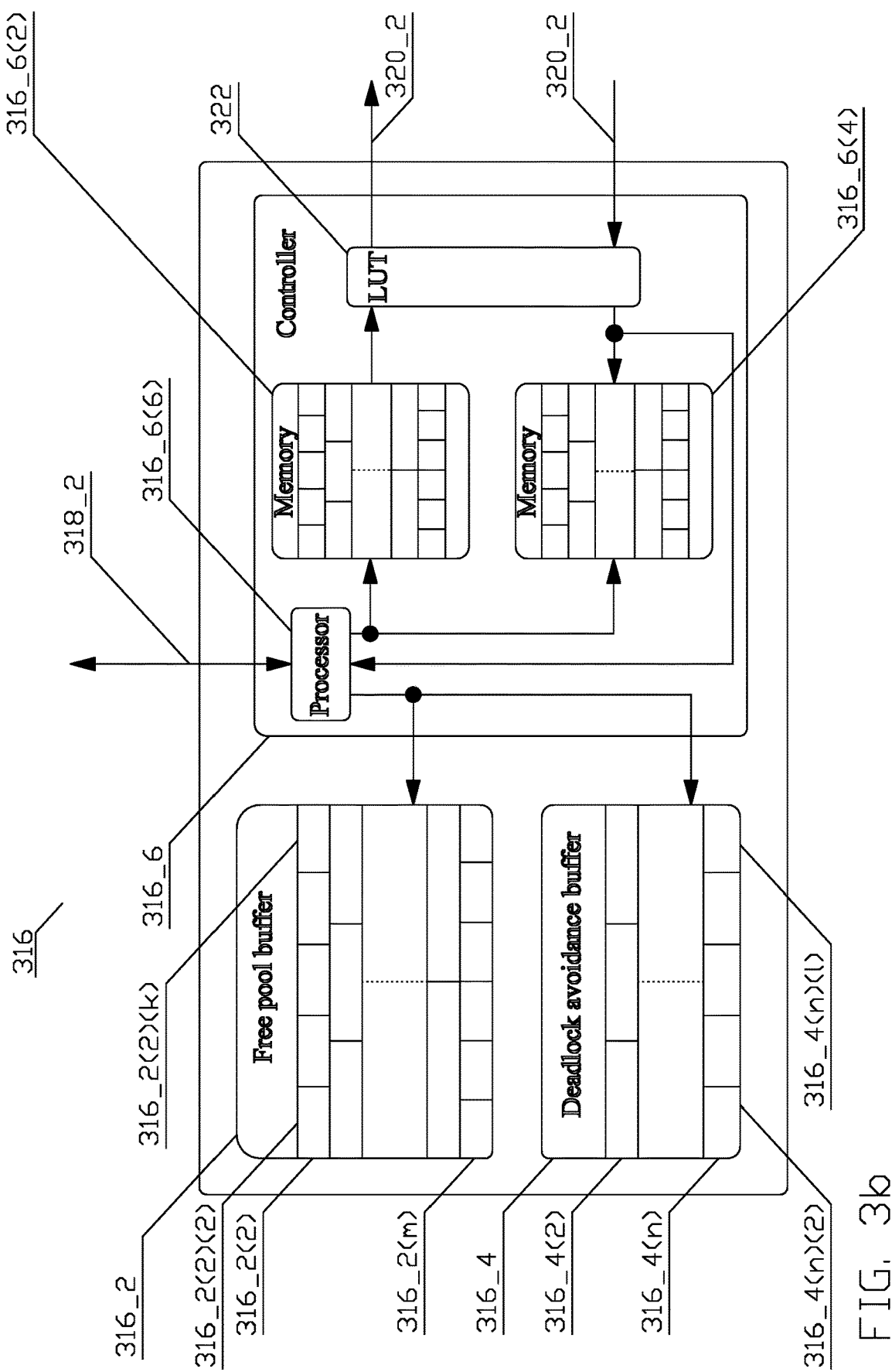
FIG. 3b depicts a conceptual structure of a reorder buffer 300 in accordance with another aspect of this disclosure.

To solve the tag size problem, in an aspect depicted in FIG. 3b, a hardware structure comprising a lookup table (LUT) 322 is added to the reorder buffer 316. Reassembling out-of-order data into correct order follows the process disclosed in FIG. 4 and associated text supra, with the following additional details.

Referring to FIG. 4a, the first process creating and issuing a fetch request proceeds through blocks 402-408 as disclosed supra, until the point when the controller (316_6) prepares the one or more segments of the fetch request including the tag comprising at least the destination buffer identifier in the reorder buffer (316) and the consumer identifier. The controller then allocates an entry in the lookup table (316_X) and writes the tag into the allocated entry. The controller then forwards the one or more segments of the fetch request with an identifier of the allocated entry in the lookup table 322. The process then continues in blocks 410-414 as disclosed supra.

Referring to FIG. 4b, the second process managing the fetch response proceeds through block 422 as disclosed in the text associated with FIG. 4b supra. In block 422, the controller (316_6) separates the requested data from the identifier of the allocated entry in the lookup table 322, retrieves the tag in accordance with the identifier, and uses the tag information to process the requested data by writing the requested data into the entry in the free buffer section (316_2) or the deadlock section (316_4) indicated by the destination buffer identifier, and updating the entry in a pending request array (316_6(4)) corresponding to the source that issued the request. Updating the entry comprises subtracting the size of the data returned by the shared memory (120_X) from the size of the request remaining in the pending request array (316_6(4)). The entry in the pending request array (316_6(4)) is updated with the result of the subtraction. The process continues in blocks 426-28 as disclosed supra.

Referring to FIG. 4c, the third process managing the transfer of the data from the reorder buffer (316) to the consumer proceeds as disclosed in the text associated with FIG. 4c supra.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow charts are not exhaustive because certain steps may be added or be unnecessary and/or may be carried out in parallel based on a particular implementation. Additionally, the sequence of the steps may be re-arranged as long as the re-arrangement does not result in functional difference.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. An apparatus for reordering out-of-order information provided by one or more memories into correct order, comprising:
   a free pool buffer comprising a first logical memory structure;
   a deadlock avoidance buffer comprising a second logical memory structure; and
   a controller communicatively coupled to the free pool buffer and the deadlock avoidance buffer.

2. The apparatus as claimed in claim 1, wherein the first logical memory structure is configured to be divisible into a plurality of entries, wherein:
   each entry comprises a group,
   each group comprises at least one item, and
   each item comprises at least one configuration word.

3. The apparatus as claimed in claim 2, wherein the plurality of entries are allocated to consumers on per needed basis.

4. The apparatus as claimed in claim 2, wherein a size of the group comprises:
a size equal to a simple proper fraction of a largest access size of the one or more memories.

5. The apparatus as claimed in claim 1, wherein:
the second logical memory structure comprises a plurality of divisions.

6. The apparatus as claimed in claim 5, wherein the plurality of divisions comprises:
a number of divisions equal to a number of consumers.

7. The apparatus as claimed in claim 5, wherein the plurality of divisions comprises:
a number of divisions equal to a number of active consumers.

8. The apparatus as claimed in claim 5, wherein each of the plurality of divisions is configured to be divisible into at least one group, wherein:
each of the at least one group comprises at least one item, and
each of the at least one item comprises at least one configuration word.

9. The apparatus as claimed in claim 8, wherein a size of each of the at least one group comprises:
a size equal to a simple proper fraction of a largest access size of the one or more memories.

10. The apparatus as claimed in claim 1, wherein the controller comprises:
a third logical memory structure organized into a plurality of ordering first-in-first-out buffers, wherein each of the plurality of ordering first-in-first-out buffers is associated with one of the plurality of consumers;
a fourth logical memory structure organized into a plurality of pending request arrays, wherein each of the plurality of pending request arrays is associated with one of the plurality of consumers; and
a controller logic communicatively coupled to the third logical memory structure and the fourth logical memory structure.

11. The apparatus as claimed in claim 10, wherein the controller further comprises:
a lookup table communicatively coupled to the third logical memory structure and the fourth logical memory structure.

12. A method for reordering out-of-order responses to fetch requests from one or more memories into correct order, comprising:
receiving a fetch request on behalf of a consumer;
determining whether there is space in a free pool buffer, and when the determination is positive then allocating the space equal to a size of a group in the free pool buffer;
else determining whether there is space in a division in a deadlock avoidance buffer assigned to the consumer that generated the fetch request, and when the determination is positive then allocating the space equal to a size of a group in the division;
creating an entry representing the group in an ordering first-in, first-out buffer associated with the consumer and an entry representing the group in a pending request array associated with the consumer;
issuing at least one segment of the fetch request comprising an associated tag to one of the one or more memories;
writing response data for each of the at least one segment of the fetch request to the allocated space in the free buffer or the deadlock avoidance buffer in accordance with each of the associated tag;
updating the entry in the pending request array in accordance with the response data; and
transferring the response data to the consumer in accordance with the entry in the ordering first-in, first-out buffer and the entry in the pending request array.

13. The method as claimed in claim 12, wherein the deadlock avoidance buffer comprises a number of divisions equal to a number of consumers.

14. The method as claimed in claim 12, wherein the size of the group equals a simple proper fraction of the largest access size of the one or more memories.

15. The method as claimed in claim 12, wherein the issuing at least one segment of the fetch request comprising an associated tag to one of the one or more memories comprises:
determining a number of segments of the fetch request in accordance with an access size of the one or more memories, the size of the group, and a size of data to be fetched; and
issuing the determined number of the segments of the fetch request.

16. The method as claimed in claim 12, further comprising:
allocating at least one entry in a lookup table;
writing each of the associated tag into one of the at least one allocated entry;
providing an identifier for each of the at least one allocated entry in the lookup table; and
using the provided identifier as the associated tag.

17. The method as claimed in claim 12, wherein the updating the entry in the pending request array in accordance with the response data comprises:
subtracting a size of the response data from a size of data remaining to be fetched; and
updating the entry in the pending request array with a result of the subtraction.

18. The method as claimed in claim 12, wherein the transferring the response data to the consumer in accordance with the entry in the ordering first-in, first-out buffer and the entry in the pending request array comprises:
determining in accordance with the entry in the pending request array whether a size of data equal to the size of the group have been returned;
determining whether a head entry of the ordering first-in, first-out buffer is non-empty; and
transferring the response data when both the determinations are positive.

19. The method as claimed in claim 18, wherein transferring the response data when both the determinations are positive comprises:
determining for each item of the response data an offset; and
transferring for each item a portion of the item identified by the offset.

20. The method as claimed in claim 16, wherein the writing response data for each of the at least one fetch request to the allocated space in the free buffer or the deadlock avoidance buffer in accordance with each of the associated tag comprises: separating the response data from the provided identifier; retrieving the associated tag in accordance with the identifier; and writing the response data to the allocated space in the free buffer or the deadlock avoidance buffer in accordance with the associated tag.

* * * * *